Dec. 15, 1936.　　　　　A. SPIRO　　　　　2,064,229

BOARD GAME

Filed Oct. 10, 1936　　　　2 Sheets—Sheet 1

THE EVENING STAR
OLD BEDFORD
Weather: Fair on Blue　　　　Thursday, October 6, 1936

INVENTOR
Amster Spiro
BY
ATTORNEYS

Dec. 15, 1936.  A. SPIRO  2,064,229
BOARD GAME
Filed Oct. 10, 1936    2 Sheets-Sheet 2

INVENTOR
Amoter Spiro
BY
Hoguet, Neary & Campbell
ATTORNEYS

Patented Dec. 15, 1936

2,064,229

UNITED STATES PATENT OFFICE 2,064,229

BOARD GAME

Amster Spiro, New York, N. Y.

Application October 10, 1936, Serial No. 104,922

7 Claims. (Cl. 273—134)

This invention relates to board games and has particular reference to the type of game which is played with tokens movable by each player along a prescribed course on the board by an amount determined by chance, this course bearing instructional indicia affording an indication for securing scoring cards usable in a particular way.

In accordance with the present invention each player represents the editor of a modern newspaper and the particular news space of the board assigned to each player is divided into columns representing the columns of the front page of a newspaper. Each column is adapted to be filled with news items, pictures, or other newspaper elements printed or otherwise formed on cards, whose width generally conforms to that of the news columns on the board and whose length is determined by the story, or the like. Each card is preferably provided with a tab or other securing means adapted to be inserted in a slot in the board, the slots preferably being arranged along the sides of each news column.

The board is provided with a series of stations describing a prescribed course, and each station bears directional indicia or instructions. When a player's token, representing his editorial staff, is moved along the course to a station determined by chance, such as by the throw of dice, the player selects a news item, photograph, or similar newspaper element from a supply identified by the indicia or legend on the station and places it in the position he chooses on the news space before him. Each card is appraised at a certain number of points news value, these points being indicated on the card. The player in general must utilize these cards, but, under certain conditions, may discard cards in favor of more newsworthy cards subsequently drawn by him from the supply box, to the end that a complete, well-balanced newspaper is composed of such cards, due consideration being given to composition. The player having the greatest total number of points at the end of the game, i. e., when all players have completed or "published" their newspapers, wins the game. The player first to publish his newspaper gains points, which, however, he may forfeit because of poor composition, penalties, or the like.

The stations on the board to which the tokens are moved in the manner described, not only determine the nature of the news item selected from the supply box but also preferably indicate penalties characteristic of modern newspaper practice, such as delays due to break-down of presses, libel warnings, poor photographs, delays in reception of expected news, delays due to transportation of material and personnel, and the like. Such penalties may require return of the player's token to the starting point, loss of several stations previously gained, relinquishment of copy and stories previously obtained, loss of position of the token because of advantages obtained by an opponent, and the like. Each player begins at his "City room" designation on the board for commencing play to gather news items essential to the formation of a modern newspaper.

For a better understanding of the invention reference may be had to the accompanying drawings, in which:

Figure 1 illustrates a preferred form of the board, which will accommodate four players;

Fig. 2 illustrates an example of a title and date line card for the newspaper to be selected by the players before play commences;

Figure 3:
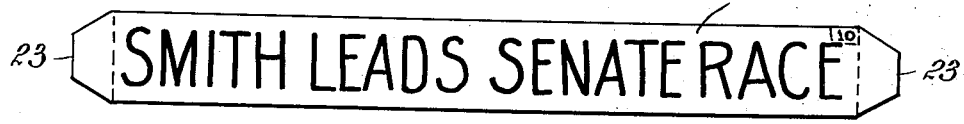
Fig. 3 illustrates an example of a headline card.

Referring to the drawings, the play board 10 illustrated in Fig. 1 is divided into four rectangular news spaces 11, preferably about eleven inches high and eight inches wide, each of which represents the blank first page of a newspaper and is divided into columns vertically by lines 12 spaced about one inch apart and preferably consisting of slots in the face of the board adapted to receive tabs for holding the news item cards in proper position in a manner to be described. The upper portion of each news space 11 is provided with short slots 13 for holding the title and date line card. Each player takes a position at one of the four sides of the board 10 and his news space 11 is accordingly at his right hand. The lower right hand corner of each player's position is preferably inscribed "City room", which is the starting point of the play for the particular player having the corresponding news space 11.

Extending around the margin of the board 10 is a continuous series of stations represented by squares 15 bearing directional instruction indicia, and there is also a series of such squares 16 extending crosswise of the board in both directions along the left hand side of each news space 11 and as these spaces 11 are rectangular, there is afforded a square area in the center of the board, which is divided into a plurality of miscellaneous instruction squares or stations 17.

The inscriptions on such stations 15, 16 and 17 preferably conform to situations indicative of the publication of a modern newspaper, including penalties and rewards, as indicated in Fig. 1. The penalty stations, for example, are preferably given a distinctive marking or color, and other stations may be characteristically marked.

A plurality of playing elements in the form of make-up cards is provided, each having tabs which may be inserted in the slots 12 and 13 to hold corresponding cards in place on the news space 11. Preferably five kinds of such cards are provided, although more or less may be adapted for use for various purposes. An example of one set of cards is illustrated in Fig. 2 and is designated 18. A number of such cards is provided and each represents a title and date line and is provided with tabs 19 adapted to be inserted in slots 13 at the head of the news space 11. These cards display the titles of fanciful or actual newspapers and are provided in various forms of type and in various styles, as indicated in Fig. 2.

Figure 4:
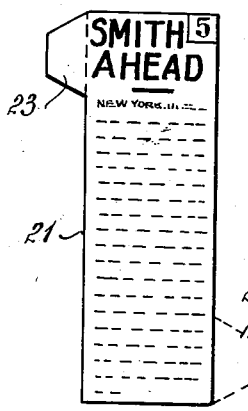
Fig. 4 illustrates an example of a news item card.
Figure 5:
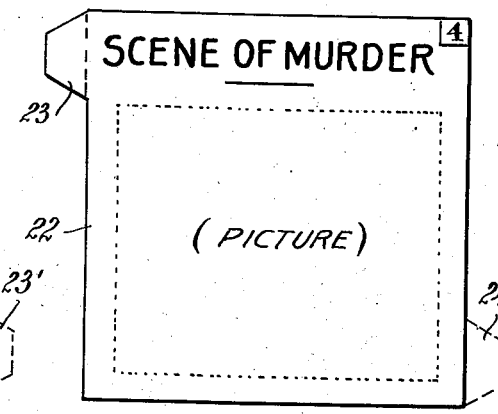
Fig. 5 illustrates an example of a photograph card.

A set of a thousand, more or less, cards are provided of a width equal to the spacing between lines or slots 12 on the board 11, such as one inch, and ranging in lengths from one-half to ten inches, according to the length of the story, all imprinted with assorted newspaper elements, such as stories, features, pictures, headings, headlines, etc., in sufficient variety to permit of "publication" of a complete and well-balanced newspaper front page. Examples of such cards are illustrated in Figs. 3, 4 and 5. Thus, Fig. 3 illustrates an example of headline card 20, Fig. 4 illustrates an example of a news item card 21, and Fig. 5 illustrates a picture card 22. Cards 20 and 22 may be two columns or more in width, as indicated. The majority of the news item cards 21 are one column in width, although several of them may be two or more columns wide. Each card is provided with lateral tabs 23 for insertion in slots 12. The cards 20 and 22 may also be provided with opposite tabs 23' if desired, as indicated in dotted lines in Figs. 3, 4 and 5. These cards are formed of cardboard or composition material and their tabs 23 and 23' are readily bent down at right angles for insertion in the slots in a manner readily understood.

Figure 7:
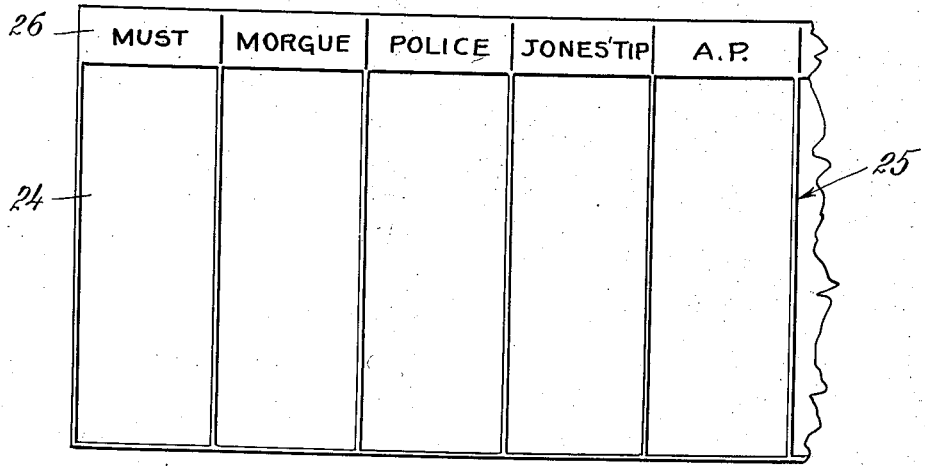
Fig. 7 illustrates a sectional compartment for containing the cards.

The cards are stored in stacks in compartments 24 in a suitable receptacle 25, shown in Fig. 7, each compartment bearing legends 26 corresponding to those appearing on the various station squares 15, 16 and 17, on the board 10. For example, one compartment of the receptacle 25 may be entitled "Must" corresponding to the numerous squares on the board 10 similarly marked "Must", which indicates that when a player is stationed on the square marked "Must" on board 10 he is required to abstract and use a miscellaneous news story or other card contained in the "Must" compartment of receptacle 25. Similarly, there are compartments 24 in receptacle 25 marked "Morgue", "Police headquarters" and the like, each containing news items or pictures of subject-matter relating to the general title of the corresponding square on board 10 upon which the player lodges. Special, high-scoring tip items, such as "Jones' tip" are lodged in a correspondingly marked compartment in receptacle 25, and so on. The headline cards 20 may be mixed with the news item and photograph cards 21 and 22, and the corresponding news item and headline cards are provided with suitable cross-reference marks, such as colors, indicia, or the like, and must be matched on the news space 11.

Each card bears in its upper right hand corner or elsewhere thereon a number as indicated in Figs. 3, 4 and 5, which represents the value of the news item, picture, flash, or the like, for use in compiling the eventual total score of the player. These numbers have no bearing upon the size of the card; thus, a smaller card may have a higher news value than a large picture, or the like, and special items such as flashes or the news tips of a leading columnist may have a relatively high score and each player seeks to reach a point where he can select one of these cards. For example, "Jones' tip" appearing as one of the center section stations 17 may have the highest news value of any of the cards in the receptacle 25, and the like.

Again, cards are provided which, if selected, render the player a member of a special press association, and it is possible that all players may be members of this association if they are correspondingly elected by taking a position on the corresponding square. Accordingly, if a player lodges on the square marked "AP", indicating Associated Press, all other players who are members of the Associated Press are entitled to abstract from the compartment marked "AP" in receptacle 25 a news card representing an "AP" flash or the like. Obviously other combinations and arrangements of the cards may be provided in conformance to modern newspaper practice, as is in general indicated by the indicia and legends inscribed on the board 10 illustrated in Fig. 1.

Figure 6:
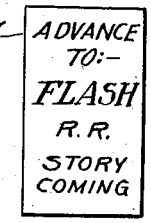
Fig. 6 illustrates an example of a penalty or reward card.

Interspersed at random between the cards in compartments 24 of receptacle 25 are instruction cards which are not news item cards, but which provide the player with a penalty or a reward, depending upon the legend. An example of such a card 27 is illustrated in Fig. 6.

Figure 8:
Fig. 8 illustrates a form of token representing the editorial staff used by each player.

Each player is provided with a playing piece in the form of a token representing the reportorial and photographic staff of the newspaper of which he is the editor. Such tokens 28 may have any form such as that illustrated in Fig. 8 and are suitably shaped or colored to distinguish from the tokens of the other players.

Figure 9:
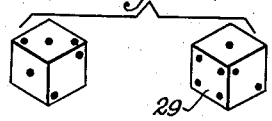
Fig. 9 illustrates in perspective a pair of conventional playing dice.

Suitable chance means, such as a pair of conventional dice, illustrated at 29 in Fig. 9, or other hazard devices or apparatus are provided for determining the starting order of the players and, subsequently, for determining the number of stations which a player moves his token.

In starting the game, the players each toss the dice once and the total tossed by each player represents his starting order, and also entitles him to select among the title and date line cards 18 one which conforms to his fancy. These cards are then secured in slots 13 provided at the head of the board selected by the player and serve as the title and date line of his newspaper to be composed on news space 11. Alternatively, the title and date lines may be permanently secured to the board 10 and the player selects the title he desired in accordance with his order of selection, determined by the numerical value of the dice thrown by him.

The actual play begins at "City room" square on station 14, each player placing his token 28 on that station corresponding to his news space 11. The players begin in accordance with the aforementioned order of selection. As each player throws the dice in succession, moving in a clockwise direction around the board 10, he moves his token 28 along the margin of board 10 the number of squares or stations 15 determined by the numerical total of the dice. For example, if the dice indicate that his position is "Society department", he draws a card from compartment 24 of receptacle 25 which is properly identified as Society department, and places the card on the news space 11 in a position conforming to his conception of the news value thereof.

If his next throw should place him on the square 15 marked "Missed boat—delay one throw", he loses his next throw and must await his turn, and other penalties are provided, as are rewards. For example, if the player reaching "Society department" square should draw from the "Society department" compartment 24 one of the special miscellaneous cards illustrated in Fig. 6, such as one marked "Flash! R. R. story coming", he may move his token 28 into the corresponding square in cross column 16 and select from the railroad story compartment in receptacle 25 a corresponding news item. He thus gains two advantages. First, he receives a high scoring flash card, and, second, by short cut he reaches the preferred center area 17, all stations of which provide cards of high news value. Otherwise, the player continues to move his token 27 along the margin or stations 15 of the board 10. When a player reaches the center area 17 with his token he must proceed diagonally as indicated by the arrows unless he receives a card 27 which entitles him to pursue a cross course. The diagonally extending stations in center area 17 may be uniformly colored to indicate the prescribed course.

Various combinations of penalties and rewards may be provided in a manner readily understood. Thus, if a player reaches a penalty station such as that marked 29 bearing the legend "Reporters barred; back to city hall", he must take his token to the starting station marked "City hall." Similarly, when his token reaches the starting square 14 he is penalized according to the instructions on station 14 and must move back to the designated place. All penalties and rewards are based upon the position assumed by the token in accordance with the numeral station determined by the dice. Of course, the dice may indicate a number of stations, which will enable passage of the token through the penalty reward stations.

With the headline cards 20, the news item cards 21 and photograph card 22, each player composes his newspaper on his news space 11 and when he fills the space 11 with cards selected before the other players, he has an advantage which, however, may be dissipated or wholly lost by penalties evoked by other players. For example, another player may draw a miscellaneous card 27 which is marked "Take murder flash 32 if on board" and which may cause him to lose that card if it is in his composition on his news space 11, and he therefore must replace that card by continuing play. In any event, each player must continue to play until the newspapers of all other players are published, so that he may lose points due to penalties. Moreover, he has the opportunity to improve his score by substituting new cards drawn for those already on the board, retaining the original cards as additions to his total score.

As aforementioned, the game is finished when all players complete or publish their newspapers, that is, fill all the spaces of their news columns 11, and generally the highest total of points wins the game. However, in accordance with predetermined instructions furnished with the game, additional rewards in points are given to players in accordance with best composition, best selection of matching type, best position of special features, such as pictures, headlines, and the like, greatest variety of exclusive stories, fewest errors and defects, and the like.

It will be seen that with this new game, players may be acquainted with the practice of modern journalism, and the composition of a modern newspaper in an interesting way, whereby the game becomes both instructive and entertaining.

Although particular arrangements of parts have been illustrated and described herein, and a specific manner of play outlined, it is to be understood that the invention is not limited thereby but is susceptible of changes in form and detail and operation within the scope of the appended claims. For example, instead of removably attaching the cards to the board in some fashion, the news spaces may be blank sheets of paper or the like, suitably imprinted with a title and date line and divided into columns in which the cards or slips of news item paper may be attached by adhesive, so that the finished newspaper becomes a more or less permanent composition. Other changes may also be made.

The terms "news items" as employed in the appended claims comprehends newspaper elements generally, such as stories, features, dispatches, pictures, headlines, headings and the like, as described herein and illustrated in the drawings.

I claim:

1. In a game apparatus utilizing chance means for selecting playing elements, the combination of a supply of cards bearing news items and representing said playing elements, and a board having a blank space representing a newspaper sheet and on which cards selected by said chance means are adapted to be arranged in simulation of a newspaper composition.

2. In a game apparatus utilizing chance means for selecting playing elements, the combination of a supply of cards bearing news items and representing said playing elements, a board having a blank space representing a newspaper sheet on which cards selected by said chance means are adapted to be arranged in simulation of a newspaper composition, and means for securing the cards on the board in said arrangement.

3. In a game apparatus utilizing chance means for selecting playing elements, the combination of a supply of cards bearing news items and representing said playing elements, a board having a blank space representing a newspaper sheet on which cards selected by said chance means are adapted to be arranged in simulation of a newspaper composition, said board having slots, and tabs on the cards for insertion in said slots for securing the cards on the board in said arrangement.

4. In a game apparatus utilizing chance means for selecting playing elements, the combination of a board having a blank space divided into columns and representing a newspaper sheet, and a supply of cards bearing news items and representing said playing elements and having widths corresponding to the widths of said columns, said cards being adapted to be selected from said supply by said chance means and arranged on the board in simulation of a newspaper composition.

5. In a game apparatus having a playing piece and chance means for determining the extent of movement of said playing piece, the combination of a board having a series of stations along which the playing piece is adapted to be moved, a supply of cards bearing news items and arranged in predetermined groups, indicia on said stations related to said groups of cards, and a blank space representing a newspaper sheet on which cards, selected from said groups in accordance with the indicia on the stations designated by the position of the playing piece as determined by said chance means, are adapted to be arranged in simulation of a newspaper sheet.

6. In a game apparatus having a playing piece and chance means for determining the extent of movement of said playing piece, the combination of a board having a series of stations along which the playing piece is adapted to be moved, a supply of cards bearing news items and arranged in predetermined groups, indicia on said stations related to said groups of cards, and a blank space representing a newspaper sheet on which cards, selected from said groups in accordance with the indicia on the stations designated by the position of the playing piece as determined by said chance means, are adapted to be arranged in simulation of a newspaper sheet, certain of the indicia on said stations directing movement of said playing piece independently of said chance means.

7. In a game apparatus having a playing piece and chance means for determining the extent of movement of said playing piece, the combination of a board having a series of stations along which the playing piece is adapted to be moved, a supply of cards bearing news items and arranged in predetermined groups, indicia on said stations related to said groups of cards, and a blank space representing a newspaper sheet on which cards, selected from said groups in accordance with the indicia on the stations designated by the position of the playing piece as determined by said chance means, are adapted to be arranged in simulation of a newspaper sheet, and special cards among said news item cards directing a play independently of said chance means.

AMSTER SPIRO.